United States Patent Office 2,960,406
Patented Nov. 15, 1960

2,960,406

CHELATED METALS IN FEEDSTUFFS FOR RUMINANTS

Bartley P. Cardon, Tucson, Ariz., assignor to Erly-Fat Livestock Feed Co., Tucson, Ariz., a corporation of Arizona No Drawing. Filed Mar. 14, 1957, Ser. No. 645,927

19 Claims. (Cl. 99—2)

This invention relates to feed compositions for animals, including ruminant farm animals.

One object of the invention is to improve animal feedstuffs by way of improvement of digestibility of such feedstuffs. It is also an object of the invention to improve animal nourishment and growth where there is a deficiency of the necessary so-called "trace minerals" in feed materials included in the animal ration.

An additional object is to improve feedstuffs having substantial or large proportions of materials of normally low digestibility, so that such materials become valuable for consumption by ruminant animals, especially beef and dairy cattle, particularly by supplying trace mineral deficiencies necessary to maintain adequate activity of digestive bacteria in the rumina of the cattle.

Viewed especially from the standpoint of ruminants, digestion involves bacteria in the rumen or "first stomach." These bacteria constitute a very important digestive factor since an improvement in their growth rate and activity greatly improves digestion and consequent animal growth. Such bacterial growth is subject to improvement in at least two respects. One of these includes intimate admixture of a liquid food typified by molasses with a ground low grade feed which is normally a cellulosic waste, typified by cotton gin waste, the bacteria in the rumen following the molasses into the remote channels of the otherwise largely non-digestible fibers, as a consequence of which digestibility of such cellulosic waste is greatly increased.

As to the second aspect of improvement, I have made the surprising discovery that where appropriate soluble trace minerals are introduced into the feed in deficiency locations, such trace minerals under such deficiency conditions are immediately employed by the bacteria in the rumen so that initial bacteria development and growth are greatly promoted, fermentation of the plant material in the rumen is increased, fermentation of more of the plant material takes place, and enhanced digestion of the low-digestibility feed material is a consequence. An additional factor in the addition of trace minerals to the ration is the increased bacteria content in the rumen ingesta as it passes from the rumen, in the process of digestion, and the increased bacteria enter the lower digestive tract along with the unused trace minerals. The bacteria are then digested by the digestive juices present in the abomasum and small intestine, and the trace minerals follow along, all the products of this digestive procedure being absorbed into the blood supply as usual.

To attain these unexpected results, the metals must be present in freely soluble forms. For this purpose I have also made the surprising discovery that these metals must be in chelated form to meet the requirements of adequate solubility and availability both from the standpoint of need therefor by the bacteria and from the standpoint of adequate use and absorption in the digestive system of the animal.

By reason of the fact that the bacteria are digested by the animal, the animal thus gains the benefit of the chelated metals which have been used by the bacteria as well as chelated metal in excess of the bacteria requirements. The animal also gains the benefit of the increased food value furnished by the augmented bacteria content.

All metals of the "essential trace metals" classification, as well as other nutritional metals required by the animal system and to be added in the feed, are to be supplied in chelated form. Thus, those metals commonly required physiologically in substantial proportions, such as calcium and magnesium, are, in accordance with this invention, introduced in chelated form, as well as those trace metals such as represented by iron, cobalt, copper, manganese, molybdenum and zinc which are required in smaller proportions. However, all of these metals which are required in the animal's system and which may be desirably supplied through addition to feed materials, are, at least for convenience, referred to herein as "essential metals" or "trace metals" or "nutritional metals." While iodine is not a metal, it is usually included in the essential trace metal group. Phosphorus falls in nutritionally with calcium, but is not a metal and cannot now be chelated. However, phosphorus may be precipitated by the metals if they are not chelated; thus chelating the metals insures phosphorus solubility and availability.

Not all of the mentioned metals are necessarily required in any given feedstuff, but any one or more of them desired may be introduced in chelated form in accordance with this invention, and according to the mineral deficiencies found in the feedstuffs conventionally available or present in pasturage. Thus, copper may be almost totally lacking in the usual feeds for a given area whereas all other metals may be adequately present. In such an instance only copper in chelated form need be added to the feedstuff, and the proportion would be such as deemed necessary to make up the deficiencies.

As an example of an additive to a feedstuff which I have used to meet mineral deficiencies in a particular beef cattle area, the following table is supplied as representing an approach to make up deficiencies in cobalt, copper, manganese, iron, potassium, and zinc, the chelating agent being any acceptable agent such as discussed hereinafter. Such additive is:

| | Lbs. |
|---|---|
| $CoSO_4 \cdot 7H_2O$ | 4.0 |
| $CuSO_4 \cdot 5H_2O$ | 5.0 |
| $MnSO_4 \cdot H_2O$ | 6.0 |
| $FeSO_4 \cdot 7H_2O$ | 7.0 |
| $ZnSO_4 \cdot H_2O$ | 3.0 |
| Chelating agent | 74.0 |
| | 99.0 |

For a given feedstuff requiring all of the above constituents to make up deficiencies in a substantial area, one pound of the above chelating mixture was dissolved in 2.5 gallons of water, and such solution was thoroughly distributed in 2½ tons of a cattle feed. This amounted to supplying 0.4 pound of the chelated metal mixture per ton of feed. Since the amounts of trace metals to be supplied are not severely critical, the chelated metals may be added to the amount of about ½ pound per ton. Where an iodine deficiency exists, iodine may be included, such as about 1% of KI in the above additive composition. Similarly, phosphorus may be included in appropirate form and amount usable for animal feeding.

Again, since this will depend upon the biological need for a given metal and upon the amount of the feed supplied per day, as where two pounds of a fairly concentrated feed are given to each animal each day, the proportion of chelated metal would ordinarily be decreased or increased as need varies and as more or less feed is consumed per day. Thus, the amount of chelated metal additive might vary from about one fifth pound (0.2 lb.) (or even less) to about one pound per ton, or even more, where using the above mixture, or from about 0.01% to 0.05% or 0.1%. Or where only one metal is required, the additive might be in the order of 0.001% to 0.005% more or less to meet deficiency needs. On the basis of a single metal constituent alone in a chelate molecule, the percentages are of course correspondingly lower and might be in the over-all range of about 0.00001% to 0.0005% for example, or according to circumstances.

Similarly the ranges of the individual metallic constituents may themselves vary in accordance with requirements, as where varying deficiencies in smaller or wider areas are to be met. Thus, assuming deficiencies in all of the above constituents are to be corrected, individual metal ranges might come within the following table:

| | |
|---|---|
| $CoSO_4 \cdot 7H_2O$ | 1 lb. to 0.001 lb. per ton |
| $CuSO_4 \cdot 5H_2O$ | 1 lb. to 0.002 lb. per ton |
| $MnSO_4 \cdot H_2O$ | 1 lb. to 0.01 lb. per ton |
| $FeSO_4 \cdot 7H_2O$ | 1 lb. to 0.01 lb. per ton |
| $ZnSO_4 \cdot H_2O$ | 1 lb. to 0.001 lb. per ton |
| Chelating agent | Quantity sufficient |

The above table may include other nutritional elements mentioned, such as:

| | |
|---|---|
| Ca as $CaCO_3$ | 40 lbs. to 1 lb. per ton |
| Mg as $MgCO_3$ | 10 lbs. to 0.5 lb. per ton |

When any or all of the above are introduced into water, the metal chelates form in water solution ready to be added to the feedstuff. Whereas molasses, or other additive liquid is used in preparing a feed, the chelate metal solution may be intimately commingled with the molasses before admixture with the feedstuff, the molasses and chelate solution then being thoroughly and intimately distributed throughout the feedstuff.

I have employed chelated metals as above for fully meeting mineral deficiencies in various feeds in various areas, these feeds including concentrated feeds and other feeds. For example feeds containing alfalfa hay, rolled barley, cottonseed meal, and other hay in ground and blocked or pelleted form have been fortified with trace metals in accordance with this invention. Mixed with these, molasses or other binders have been used in appropriate quantity, such as 10% to 40%, to facilitate block forming or pelleting and also to supply another food constituent such as the mentioned molasses.

I have also treated feed materials for ruminant animals with chelated metal additives in accordance with this invention in which the body of the feedstuff included a large proportion of further modified roughage such as cotton gin waste and kindred waste commonly considered to have little food value. In the case of cotton gin waste and similar wastes, such as bagasse, pineapple waste and the like, molasses, especially sugar cane molasses and beet molasses, has been added to ground waste materials, and chelated metal constituents of this invention introduced into the molasses and ground fiber mixture, the resultant product being then pelleted or pressed into blocks of appropriate size and shape. Here cotton gin waste and the like have been ground to pass a one-inch screen, or more commonly a half-inch screen, and then intimately mixed with the indicated molasses and the indicated metal chelate solutions hereof.

It has been found that the digestibility of ground cotton gin waste passing a half-inch screen has been raised from about 35% or lower to 50% or higher by intimately mixing such ground waste with sugar cane molasses, or beet molasses, or citrus molasses. This improvement is due to the fact that in the ruminant animal, bacteria development in the rumen is facilitated by the presence of the molasses when thoroughly distributed in the cellulosic waste fibers by reason of intimate admixture and compression, the molasses greatly aiding both the growth and the activity of these bacteria.

This improvement in such roughage digestibility to even 60%, or a litle more, often occurs where there is no nutritional metal deficiency, but appears to drop off where there is significant deficiency in such minerals, especially in the essential trace metals. By correcting the deficiency of such metals, a digestibility which may be nearer 50% is brought up to normal digestibility such as the mentioned 60%.

However, I have made the unexpected discovery that, when metal deficiencies are made up by the use of chelated metals in accordance with this improvement, bacteria development and growth are so greatly enhanced by the chelate form of the make-up metals that digestibility often increases to as much as 75%, and bacteria activity appears to go beyond normal. Some of these metals are taken up by the bacteria to activate and vastly increase their numbers, which also increases fermentation and subsequent digestion in the intestines. These bacteria increases themselves provide an additional nourishment factor for the ruminant animal, as previously indicated, when they pass on into the intestines for normal digestion and absorption. Such absorption includes not only the metal constituents taken up by the bacteria but also excess metal constituents over the requirements of the bacteria.

Thus, when metal deficiencies are corrected with chelated metals in accordance with this invention, bacteria activity and digestibility of cotton gin waste roughage and other waste roughage, go well beyond normal.

More specifically, digestibility may be increased in the presence of chelated nutritional metals, as described, to as much as around 5% to perhaps 15% above normal. These improvements due to the presence of chelated trace metals, added to the improvements produced by the presence of a good bacteria food additive, such as the mentioned molasses, make ruminant feeding with otherwise low-digestibility cellulosic waste a very important phase of beef and dairy cattle feeding. In addition to the improvement in the feeding of ruminant animals, the supplying of chelated nutritional metals to feeds for simple-stomached animals, such as poultry and swine, is of much importance in areas of mineral deficiencies.

The value in chelating the nutritional metals in accordance with this invention possibly is explained by the fact that the metal portion of the chelate is only slightly ionized (as compared with the usual water-soluble salts), and hence the chemical activity of the chelated metal is extremely low and tremendously reduced over water-soluble salts. Consequently the chelate solution is chemically stable. Thus, when chelated metals are mixed and placed in solution, they do not undergo change. Also, they are still biologically available. In fact, their availability apparently is increased by chelation because, in their chelated form, they are protected from change which would otherwise be caused by the fluids and juices of the digestive tract. This is quite a distinguishing factor over the usual water-soluble salts, which are generally highly ionized in solution so that the metal portion of the salt is in solution as the ion and is in a very active state and will react readily with other metals and/or ions, thus having its chemical properties greatly changed.

While calcium and magnesium are required in relatively large amounts in the feedstuffs (such as 12 to 20 grams per day each) as compared with the essential trace metals (1 to 20 milligrams per day each), and are often therefore supplied as an unchelated mineral supplement, nevertheless it is very desirable that even these alkaline earth metals be supplied in chelated form because chelating makes them much more readily available biologically.

Respecting agents appropriate for effecting chelation with the various metals herein discussed, any agents having chelating activity are usable, at least so long as they are nontoxic. Many such agents are sold under various trade names and are commonly available under the general designation of chelating agents or sequestering agents. Other chelating agents in general include succinic acid, malic acid, aspartic acid, citric acid, tartaric acid, amino acids, and many of the peptides such as diglycine, triglycine, and alanylglycine. A preferred group of chelating agents is the ethylene diamine tetraacetic acid series which includes ethylene diamine tetraacetic acid itself and such derivatives as its mono- and disodium salts. The above are given as examples of the large class of chelating agents usable for the present purpose.

The chemistry of these coordination complexes is well understood, but it is indicated by the following formula wherein calcium is representative of the metal being chelated and the chelating agent is represented by the ethylene diamine tetraacetic acid mentioned:

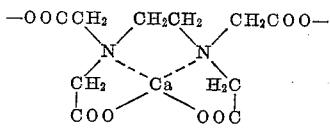

Other specific examples are ethylene diamine cobalt chloride having the structural formula:

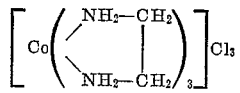

Another specific example is dimethyl glyoximo copper having the structure:

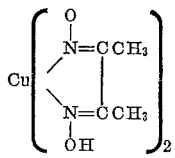

Where percentages are given herein, they refer to proportions by weight. When the term "molasses" is used, it is intended generally to refer to a molasses concentration of the standard 80 Brix, in which the numeral represents in general about five points higher than the percentage of solids present. In other words 80 Brix signifies about 25% water and 75% solids. These values apply to other molasses herein mentioned as well as sugar cane molasses.

In connection with the frequent reference to cellulosic waste materials, and the particularly mentioned cotton gin waste, such waste is a common product of the cotton gin and includes immature cotton bolls, unopened cotton bolls, the outer coverings of the bolls from which the cotton has been removed, and some leaves and stems along with lint and other foreign matter accumulated in the cotton handling operations. Such waste material is sometimes also known as "cotton burrs" or "gin trash." The hulls of the cotton seeds removed in production of cotton seed meal may also be included in the term. The grinding operation mentioned may be performed in any suitable apparatus such as a rotary grinder, hammer mill or the like. In one product containing cotton gin waste and molasses it has been found desirable to reduce the material so that it will pass a ⅜-inch or ½-inch screen, and this has sometimes been referred to as "fine grinding." Such fine grinding is quite desirable because it insures penetration by the indicated molasses sufficiently deeply into the fibers, when the mass is converted into pellets or pressed blocks, to insure maximum digestibility. Desirably the other cellulosic waste materials are similarly prepared. Where a treated feed is produced including alfalfa hay, this also desirably is ground to pass a ½-inch screen in order to insure adequate molasses penetration. The terms "fine grinding" and "grinding" here used are to be distinguished from extremely fine grinding often employed for making easily extruded pellets and wherein the ground materials easily pass a ⅛-inch mesh screen. In fact the terms here used are intended to include grinding to pass up to one-inch mesh screens. Such relatively coarser grindings are important so as to yield a substantially matrix upon which bacteria may develop in the rumen.

The various feedstuffs mentioned, which contain molasses or other binder in percentages such as indicated are readily molded or compressed into blocks or passed through pelleting machines to yield solid dry products ready for feeding or other handling.

The invention claimed is:

1. A ruminant feed, containing a substantial proportion of feed material of low digestibility, and a minor proportion of a nontoxic trace metal chelate in which the chelated metal is selected from the group consisting of iron, cobalt, copper, manganese, molybdenum, zinc, and iodine, whereby the growth rate and activity of the bacteria in the animals' stomachs are improved so as to increase the digestibility of the feed material.

2. The method of increasing the growth rate of bacteria in the stomachs of ruminant animals, comprising introducing therein at least about .001 of 1%, based on the amount of solid food, of a nontoxic trace metal chelate in which the chelated metal is selected from the group consisting of iron, cobalt, copper, manganese, molybdenum, zinc and iodine.

3. The method of increasing the growth rate of bacteria in the stomachs of ruminant animals, comprising introducing therein at least about .001 of 1%, based on the amount of solid food, of a nontoxic iron chelate.

4. The method of increasing the growth rate of bacteria in the stomachs of ruminant animals comprising introducing therein at least about .001 of 1%, based on the amount of solid food, of a nontoxic cobalt chelate.

5. The method of increasing the growth rate of bacteria in the stomachs of ruminant animals, comprising introducing therein at least about .001 of 1%, based on the amount of solid food, of a nontoxic copper chelate.

6. The method of increasing the growth rate of bacteria in the stomachs of ruminant animals, comprising introducing therein at least about .001 of 1%, based on the amount of solid food, of a nontoxic manganese chelate.

7. The method of increasing the growth rate of bacteria in the stomachs of ruminant animals comprising introducing therein at least about .001 of 1%, based on the amount of solid food, of a nontoxic zinc chelate.

8. A feed material for ruminants containing from about .001 of 1% to about .005 of 1% of a nontoxic trace metal chelate in which the chelated metal is selected from the group consisting of cobalt, copper, iron, manganese, molybdenum, iodine and zinc.

9. A feed material for ruminants containing from about .001 of 1% to about .005 of 1% of a nontoxic iodine chelate.

10. A feed material for ruminants containing from about .001 of 1% to about .005 of 1% of a nontoxic cobalt chelate.

11. A feed material for ruminants containing from about .001 of 1% to about .005 of 1% of a nontoxic copper chelate.

12. A feed material for ruminants containing from about .001 of 1% to about .005 of 1% of a nontoxic manganese chelate.

13. A feed material for ruminants containing from about .001 of 1% to about .005 of 1% of a nontoxic zinc chelate.

14. A feed material for ruminants containing from about .001 of 1% to about .1 of 1% of a mixture of nontoxic metal chelates of iodine, cobalt, copper, manganese and zinc.

15. A ruminant feed containing a substantial proportion of feed material of low digestibility; and a minor proportion of a nontoxic iron chelate, whereby the growth rate and activity of the bacteria in the animal's stomach are improved so as to increase the digestibility of the feed material.

16. A ruminant feed containing a substantial proportion of feed material of low digestibility; and a minor proportion of a nontoxic cobalt chelate, whereby the growth rate and activity of the bacteria in the animal's stomach are improved so as to increase the digestibility of the feed material.

17. A ruminant feed containing a substantial proportion of feed material of low digestibility; and a minor proportion of a nontoxic copper chelate, whereby the growth rate and activity of the bacteria in the animal's stomach are improved so as to increase the digestibility of the feed material.

18. A ruminant feed containing a substantial proportion of feed material of low digestibility; and a minor proportion of a nontoxic manganese chelate, whereby the growth rate and activity of the bacteria in the animal's stomach are improved so as to increase the digestibility of the feed material.

19. A ruminant feed containing a substantial proportion of feed material of low digestibility; and a minor proportion of a nontoxic zinc chelate, whereby the growth rate and activity of the bacteria in the animal's stomach are improved so as to increase the digestibility of the feed material.

References Cited in the file of this patent

UNITED STATES PATENTS

| | | |
|---|---|---|
| 2,239,543 | Andrews et al. | Apr. 22, 1941 |
| 2,604,401 | Ely | July 22, 1952 |
| 2,715,067 | Kamlet | Aug. 9, 1955 |
| 2,744,824 | Lent | May 8, 1956 |
| 2,875,129 | Bersworth et al. | Feb. 24, 1959 |

OTHER REFERENCES

Martell et al.: Chemistry of The Metal Chelate Compounds, 1956, pp. 88, 191–4, Prentice-Hall, Inc., Englewood Cliffs, N.J.